United States Patent [19]

Ruscev et al.

[11] Patent Number: 5,005,422

[45] Date of Patent: Apr. 9, 1991

[54] METHOD AND APPARATUS FOR MEASURING SUBSIDENCE

[75] Inventors: Mario Ruscev, Issy Les Moulineaux; Patrick Vandenabeele, Clamart, both of France

[73] Assignee: Schlumberger Technology Corporation, New York, N.Y.

[21] Appl. No.: 407,138

[22] Filed: Sep. 14, 1989

[30] Foreign Application Priority Data

Sep. 14, 1988 [FR] France ................... 88 11955

[51] Int. Cl.$^5$ .............................................. G01B 7/16
[52] U.S. Cl. .................................................... 73/784
[58] Field of Search ................. 73/151, 784; 250/253, 250/256, 259–261, 265, 266, 268; 175/40, 41, 50; 166/255; 33/1 H, 332

[56] References Cited

U.S. PATENT DOCUMENTS

| | | | |
|---|---|---|---|
| 3,869,607 | 3/1975 | Sandier et al. | 250/266 |
| 4,125,013 | 11/1978 | Nicolas et al. | 73/151 |
| 4,719,803 | 1/1988 | Capelle et al. | 73/784 |

FOREIGN PATENT DOCUMENTS 0281481 7/1988 European Pat. Off. .

OTHER PUBLICATIONS

D. R. Allen, Collar and Radioactive Bullet Logging for Subsidence Monitoring, Transactions of the SPWLA, Tenth Annual Logging Symposium, pp. 1–19 (May 25–28, 1969).

H. Kametani et al., Characteristics of the Self-Quenching Streamer Mode in a Gas Counter, Japanese Journal of Applied Physics, vol. 23, No. 12, pp. L922–L924 (Dec. 1984).

M. Matoba et al., One Meter Single-Wire Position Sensitive Proportional Counter for Low Ionization Particles, 165 Nuclear Instruments and Methods, pp. 469–476 (1979).

*Primary Examiner*—Robert Raevis
*Attorney, Agent, or Firm*—Clifford L. Tager

[57] ABSTRACT

The present invention relates to a method and apparatus for measuring subsidence by evaluating the distance between radioactive markers which have previously been implanted in the formation traversed by a borehole. The apparatus comprises an elongate body containing at least two nuclear detection assemblies which are spaced apart along the longitudinal axis of the body. Each detection assembly inludes at least one position sensitive detector for detecting position along the longitudinal axis of the body. Measurements are performed while the apparatus is held stationary opposite the markers.

5 Claims, 2 Drawing Sheets

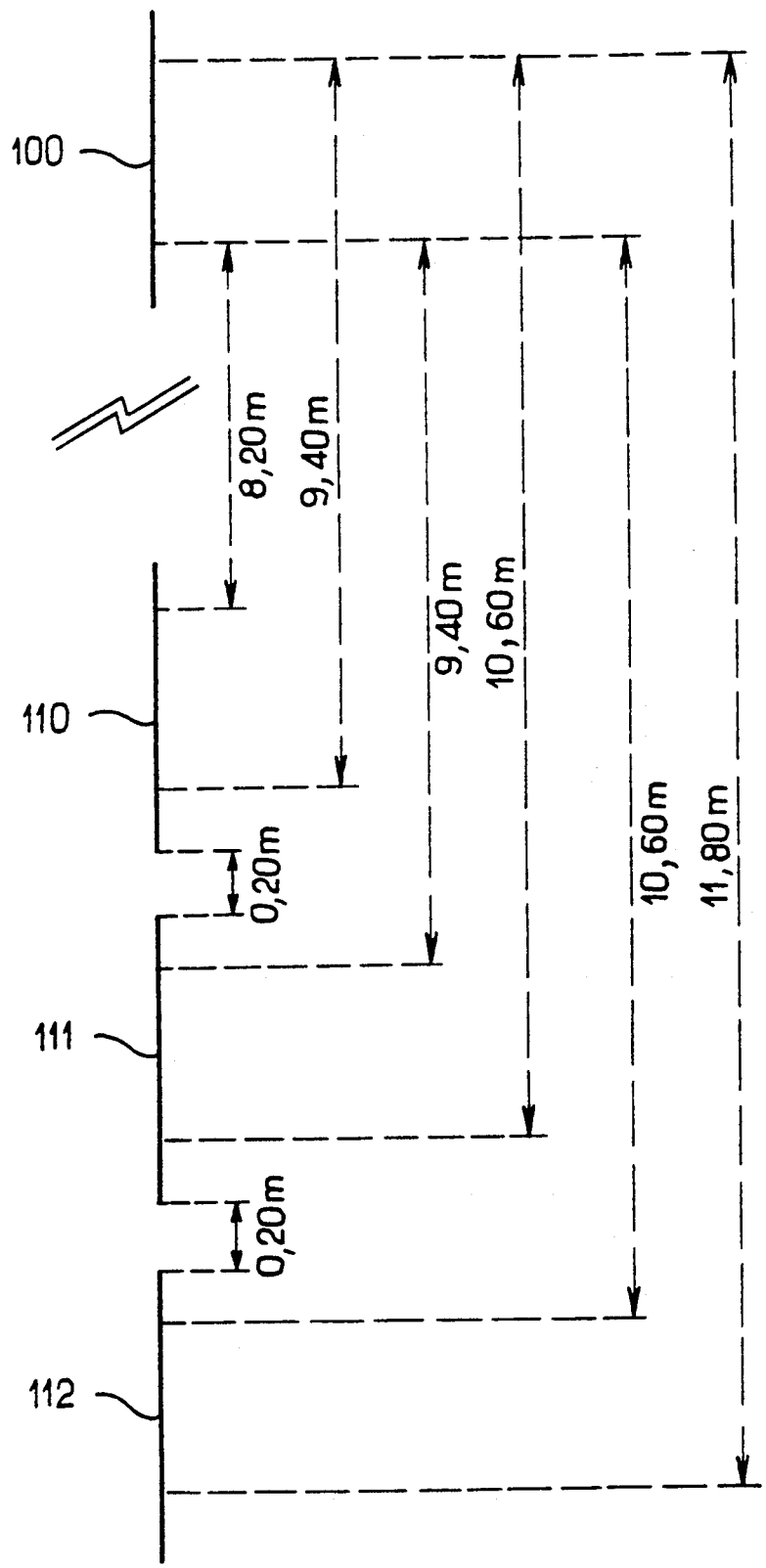
FIG._4

METHOD AND APPARATUS FOR MEASURING SUBSIDENCE

TECHNICAL FIELD

The present invention relates to a method and apparatus for measuring subsidence by evaluating with high precision the distance between radioactive markers previously implanted in the walls of a borehole. When such a measurement is repeated from time to time, it is possible to evaluate the amplitude of the phenomenon of subsidence in subsurface strata after fluid extraction, in particular, after hydrocarbon extraction.

BACKGROUND

A conventional technique for observing the subsurface subsidence phenomenon is described in the article by R. D. Allen, entitled "Collar and Radioactive Bullet Logging for Subsidence Monitoring", Tenth Annual Logging Symposium, Society of Professional Well Log Analysts, May 1969, herein incorporated by reference. The article discusses implanting a plurality of axially-spaced radioactive bullets in the side walls of a borehole, and periodically recording nuclear well logs by means of a well logging tool having two longitudinally-spaced scintillation gamma ray detectors so as to detect any changes that might have occurred in the distances between the bullets, thereby evaluating the magnitude of the subsidence phenomenon.

When acquiring a log, gamma ray intensity is recorded continuously as a function of information relating to the depth of the logging tool as provided by a tangential wheel device which is directly engaged with the cable. Given the elasticity of the cable and the somewhat irregular displacement of the logging tool suspended at the end of the cable, the resolution of depth measurements is not sufficient for observing very small variations as a function of time.

The present invention provides a solution to these drawbacks and makes it possible to substantially improve the precision with which the distance separating the radioactive markers is measured.

SUMMARY OF THE INVENTION

In a first aspect, the present invention provides a method of measuring subsidence in subsurface formations having a borehole passing therethrough in which at least two radioactive markers have been previously implanted spaced apart along the longitudinal axis of the borehole, the method comprising the steps of:

inserting a measuring apparatus into the borehole, said measuring apparatus comprising at least two nuclear detection assemblies spaced apart along the longitudinal axis of said apparatus, with the distance between said detection assemblies being known and substantially equal to the distance between the radioactive markers, each of said assemblies including at least one position sensitive detector for performing position determination along the longitudinal axis of said apparatus;

holding said apparatus stationary in the borehole in such a manner that each of said detection assemblies is placed opposite a corresponding radioactive marker; and performing measurements for localizing the radioactive markers while the apparatus is held stationary.

Preferably, the apparatus is held stationary by means of at least one anchor section.

In a second aspect of the invention, the apparatus for measuring subsidence comprises an elongate body containing at least two nuclear detection assemblies which are spaced apart along the longitudinal axis of the body, and each detection assembly includes at least one position sensitive detector for performing position determination along the longitudinal axis of the body.

Preferably, the detector is a gas detector whose anode wire is parallel to the longitudinal axis of the apparatus; the length of the wire is about one meter. The detector may be operated in the proportional counter region of its characteristic, however, it is preferable to operate in its limited Geiger Muller region, (also known as self-quenching streamer mode).

In a first embodiment, at least one of the detection assemblies comprises a plurality of identical detectors disposed in parallel so as to observe the same interval of the formation.

In a second embodiment, at least one of the detection assemblies comprises a plurality of detection subassemblies each including a plurality of detectors disposed in parallel, with the subassemblies being spaced apart along the longitudinal axis of the body.

In a third embodiment of the invention, at least one of the detection assemblies comprises a plurality of detection subassemblies each including a plurality of detectors disposed in parallel, with the subassemblies being displaced in a staggered configuration such that each subassembly partially overlaps the adjacent subassemblies.

BRIEF DESCRIPTION OF THE DRAWINGS

FIG. 4 is a diagram of an embodiment comprising detection subassemblies which are spaced apart along the longitudinal axis of the apparatus.

DESCRIPTION OF A PREFERRED EMBODIMENT

Figures 1, 2, 3:
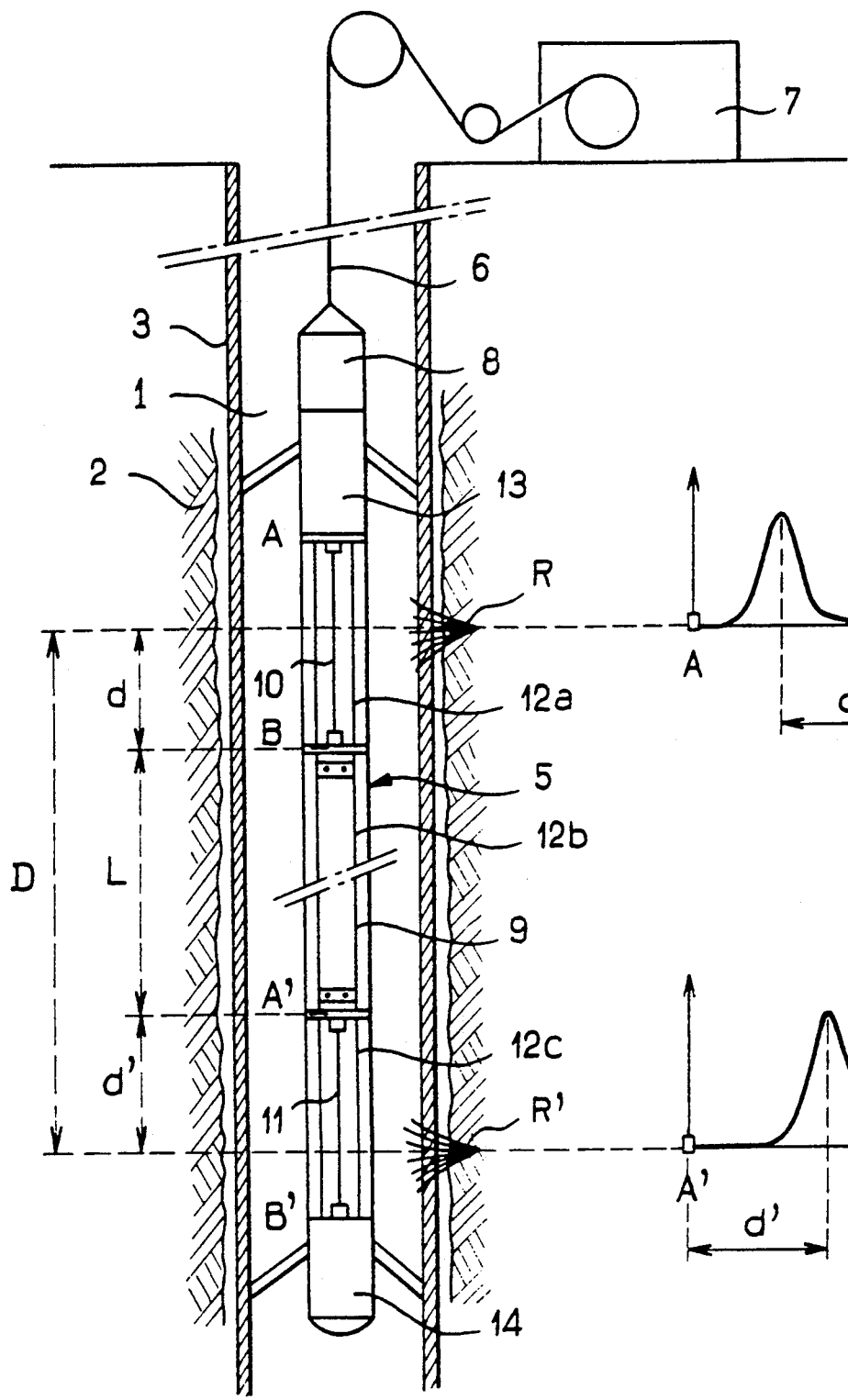
FIG. 1 is a diagram showing a subsidence measuring apparatus in accordance with the invention held stationary in a borehole opposite radioactive markers.
FIGS. 2 and 3 are histograms generated from the signals obtained by the top and bottom detectors respectively.

With reference to FIG. 1, borehole 1 passes through geological formations 2. Before performing subsidence measurements on the geological formations, a plurality of markers, such as R and R', are implanted in the side walls of borehole 1 by means of an explosive device, and casing 3 is optionally installed. Each marker contains a radioactive substance, for example a pellet of Cesium 137 of about 100 micro-curies. The initial distance D between two successive markers R and R' generally lies within a range of 8.5 meters (m) to 11.5 m.

In order to evaluate subsidence phenomena, measurements are performed from time to time by means of nuclear measuring apparatus 5 in order to obtain accurate position measurements and thus estimate the magnitude of the subsidence phenomenon.

Measuring apparatus 5 is suspended in conventional manner from the end of cable 6 which provides an electrical connection in known manner between the logging tool and surface equipment 7. The measuring apparatus comprises, in particular: electronic section 8 for electrically powering the logging tool, for transmitting signals it detects to the surface equipment and for receiving various commands sent by the surface equipment; at least two detection assemblies 10 and 11 for measuring radioactive radiation, e.g., gamma radiation as emitted by a Cesium pellet; spacer 9 of length L which is known to a high degree of precision and which is slightly less than the distance D between the markers R and R'; and two anchor sections 13 and 14.

In accordance with the invention, detection assemblies 10 and 11 are position sensitive detectors along the longitudinal axis of the apparatus. Of the various existing types of position sensitive detectors, the applicants prefer to use a gas detector, and more particularly a gas detector whose anode wire runs parallel to the longitudinal axis of the logging tool and has a length of about one meter.

The logging tool is positioned in such a manner that its detectors 10 and 11 are held stationary opposite the markers R and R'. Once logging tool 5 has been fixed, counting is initiated at the outputs A,B,A', and B' of detectors 10 and 11.

The radioactive marker is located by using the charge division position determination technique. With this technique, the incident gamma radiation is detected in the wall of the detector by the ejection of fast electrons into the gas. After electron multiplication, charges reach the anode wire at impact point I. The pulses generated by the charges reach the ends of the anode wire after being attenuated by an amount defined by the chain of resistances on either side of impact point I.

According to the charge division position determination technique, the following equations may be written:

$$\delta = \frac{Q_B}{Q_A + Q_B} \text{ and } \delta' = \frac{Q_{A'}}{Q_{A'} + Q_{B'}} \text{ where}$$

$\delta$ is the distance between the impact point of a gamma ray and the end B of detector 10;

$\delta'$ is the distance between the impact point of a gamma ray and the end A of detector 11; and $Q_A$, $Q_B$, $Q_{A'}$, and $Q_{B'}$ represent the charges detected at the ends A and B of detector 10 and at the ends A' and B' of detector 11, respectively.

A histogram (see FIG. 2) is constructed over a set of elementary measurements $\delta_1, \delta_2, \ldots, \delta_n$, representative of of the points of impact of the gamma rays emitted by marker R and detected by detector 10, and the position of the peak of the histogram is detected using one of the conventional techniques. The position of this peak defines longitudinal distance d between marker R and end B of detector 10.

Similarly, a histogram (see FIG. 3) is constructed using the set of elementary measurements $\delta_1', \delta_2', \ldots, \delta_n'$, representative of the position of the point of impact of the gamma rays emitted by marker R' and detected by detector 11, and the position of the peak is detected in order to determine longitudinal distance d' between marker R' and end A' of detector 11.

Distance D between the two radioactive markers is deduced therefrom as follows:

$$D = d + L + d'$$

A detailed description of this charge division position determination technique is found in the article by M. Matoba, K. Tsuji, K. Marubayashi, and T. Shintake, "One Meter Single-wire Position Sensitive Proportional Counter for Low Ionization Particles", Nuclear Instruments and Methods, No. 165, pps. 469-76 (1979), herein incorporated by reference. This article also describes a method of designing an electronic counter circuit associated with the gas detector.

The detector in the article by M. Matoba, et al., operates in proportional counter mode. However, it is preferable to make counters operate in a region which has a greater electron multiplication factor, i.e. while still maintaining a self-quenching electron avalanche under steady state conditions. These operating conditions are commonly referred to as "limited Geiger Muller conditions" or "Self-quenching Streamer Mode" (SQS). The advantages of such operating conditions are described at length in the article by H. Kametani et al., "Characteristics of the Self-quenching Streamer Mode in a Gas Counter", Japanese Journal of Applied Physics, Vol. 23, No. 12 (December 1984), herein incorporated by reference.

Preferably, the detectors are fixed on measuring apparatus 5 comprising elements 12a, 12b, and 12c which are assembled to one another. Elements 12a, 12b and 12c are made of Invar in order to reduce error due to thermal expansion of the chassis. In addition, chassis deformation due to the influence of thermal expansion of the outer envelope of the logging tool is avoided by preferably using a longitudinally floating mount for the chassis inside the outer envelope.

It is also preferable to fix nuclear measuring apparatus 5 level with the radioactive markers R and R', e.g. by using anchor sections 13 and 14, with one particular embodiment of such anchor sections being described in U.S. Pat. No. 4,125,013, herein incorporated by reference. Any motion of the logging tool, such as small oscillations induced by rising fluids in a well which is in production, has the effect of flattening the histogram and consequently of reducing precision with which the peak in the histogram is determined.

In order to improve the overall efficiency of gamma ray detection, it is further desirable for each detection assembly to include a plurality of gas detectors mounted in parallel so as to simultaneously scan the same portion of the formation. They are preferably regularly distributed along the longitudinal axis of the logging tool.

By measuring distance D between the radioactive markers as a function of time elapsed since the markers were put into place, it is possible to obtain the looked-for indications concerning possible compacting of the formations situated between the two markers.

An essential difference compared with measuring techniques used in the past needs to be particularly emphasized: in accordance with the invention, measurement is performed statically, i.e., radioactivity is measured while the logging tool is fixed in position, whereas in prior techniques measurement is performed dynamically, i.e., measurement is performed while the logging tool is displaced. Static measurement has the particular advantage of avoiding errors related to any acceleration of the logging tool in motion.

Given that the radioactive marker is at a distance of about 15 cm from the detector, the space dispersion of the gamma radiation flattens the recorded radioactivity peak. It is consequently necessary to perform measurements during a relatively long period of time (say, 10 to 20 minutes) in order to obtain a regular distribution curve. Tests performed by the applicants show that the width of the peak is typically 0.2 m at peak half amplitude. The useful range of the detector is thus considerably reduced, for example if the detector is 1 m long, then the useful range is no more than 0.6 m as twice the width of the peak is necessary for a good center location.

For a spacer whose length L is 9 m, the logging tool is thus capable of operating over a useful range of distance D situated between 9.40 m and 10.60 m.

However, it may be that this useful range is insufficient because it is relatively common, as mentioned above, for the distance D between two successive markers to lie over a larger range, e.g. 8.50 m to 11.50 m.

A first possible solution consists in using longer gas detectors, e.g. 2 m long. However, this solution suffers from problems relating to temperature behavior and resolution of the detector. A second possible solution consists in making use of a set of spacers having different lengths. Although this solution appears to be acceptable on first sight, it nevertheless suffers from the drawback of taking a production well out of service for a relatively long period of time since it is necessary to lower the measuring apparatus several different times.

A third, and preferred, possible solution consists in fitting at least one end of the spacer with a plurality of gas detectors. With reference to FIG. 4, an embodiment of the third solution is shown, wherein the bottom end, for example, of the spacer is equipped with a plurality of detection subassemblies 110, 111 and 112 which are longitudinally spaced apart along the axis of the logging tool. The other end of the spacer is fitted with a single detection subassembly 100. Each of subassemblies 100, 110, 111 and 112 comprises a plurality of detectors in parallel.

Given that the useful range of each detection subassembly is limited to 80 cm, for example, it is possible by virtue of the multiplicity of combinations between the subassemblies and by virtue of judicious subassembly disposition, to obtain a useful range for the logging tool as a whole which is both greater and continuous. In the example of FIG. 4, each of the subassemblies 110, 111 and 112 is 1 m long and the gaps between them are 20 cm long. Detection subassembly 100 is also 1 m long, and the spacer between subassemblies 100 and 110 is 7.8 m long. Three contiguous ranges of 1.2 m each are thus obtained, thereby giving an overall range of 8.2 m to 11.8 m.

Naturally, the description of this disposition is given purely by way of example. Other arrangements of this type could be envisaged without thereby going beyond the scope of the present invention. More particularly, each of the detection subassemblies could be constituted by a plurality of subassemblies, or the subassemblies could be disposed in a zig-zag configuration so as to overlap partially and thus obtain a detection assembly providing continuous coverage over a larger length of formation.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What we claim as our invention is:

1. A method of measuring subsidence in subsurface formations traversed by a borehole, the formation having at least two radioactive markers previously implanted therein, the markers spaced apart along the longitudinal axis of the borehole, the method comprising the steps of:

inserting a measuring apparatus into the borehole, the measuring apparatus comprising at least two nuclear detection assemblies spaced apart along the longitudinal axis of the apparatus, wherein the distance between the detection assemblies is substantially equal to the distance between the radioactive markers, each of the assemblies including a position sensitive detector to perform position determination along the longitudinal axis of the apparatus;

positioning the apparatus in the borehole such that each of the detection assemblies is substantially opposite a corresponding radioactive marker;

securing the apparatus in said position; and performing measurements for localizing the radioactive markers while the apparatus is thereby secured.

2. The method according to claim 1, wherein said step of securing the apparatus includes holding the apparatus in position by using at least one anchor section.

3. The method according to claim 1 wherein the position sensitive detector is a gas detector.

4. The method according to claim 3, wherein the gas detector comprises an anode wire aligned with the longitudinal axis of the apparatus, with each marker being localized by the charge division position determination technique.

5. The method according to claim 1, wherein said step of performing measurements comprises determining a histogram of the position of the point of impact of the rays emitted by the radioactive marker relative to the corresponding position sensitive detector.

* * * * *